United States Patent [19]
Kim et al.

[11] Patent Number: 5,754,232
[45] Date of Patent: May 19, 1998

[54] ZIG-ZAG AND ALTERNATE SCAN CONVERSION CIRCUIT FOR ENCODING/DECODING VIDEOS

[75] Inventors: Kyeoun Soo Kim; Si Joong Kim, both of Teajeon, Rep. of Korea

[73] Assignee: Korea Telecommunication Authority, Rep. of Korea

[21] Appl. No.: 689,252

[22] Filed: Aug. 5, 1996

[30] Foreign Application Priority Data

Aug. 3, 1995 [KR] Rep. of Korea .................. 1995-23941

[51] Int. Cl.$^6$ ..................... H04N 7/30; G06K 9/36
[52] U.S. Cl. ................ 348/390; 382/246; 382/245; 358/261.4
[58] Field of Search ...................... 348/400, 403, 348/404, 408, 390; 382/244, 245, 246, 248, 250; 358/261.1, 261.3, 427, 261.4, 432, 433, 261.2

[56] References Cited

U.S. PATENT DOCUMENTS

| | | | |
|---|---|---|---|
| 5,367,629 | 11/1994 | Chu et al. | 348/400 |
| 5,555,321 | 9/1996 | Ogura et al. | 382/250 |
| 5,627,917 | 5/1997 | Chen | 382/246 |

*Primary Examiner*—Amelia Au
*Attorney, Agent, or Firm*—Merchant, Gould, Smith, Edell, Welter & Schmidt

[57] ABSTRACT

A zig-zag and alternate scan conversion circuit for encoding/decoding videos which is structured only by logic circuits using a regularity of scan address patterns, thereby achieving an improvement in processing speed and a reduction in area. The circuit includes a zig-zag and alternate scan address generating unit for receiving a start signal, a basic operation clock signal, and a control signal indicative of whether the scan pattern of input data is a zig-zag scan pattern or an alternate scan pattern, and executing an operation for writing the input data on a RAM and reading them from the RAM based on the received signals, a raster address generating unit for receiving the same signals as those received in the zig-zag and alternate scan address generating unit and executing a writing/reading operation of the input data, a pair of multiplexor units each for appropriately selecting an address signal from the address generating units; and a latch unit for outputting address signals selected from the multiplexor units while controlling the timing of the address signals. The circuit can be applied to systems requiring high-speed data processing such as B-ISDN terminals and high definition televisions. The circuit can also be easily used in systems including circuits designed in the form of a VLSI which will be used as an application-specific integrated circuit (ASIC).

10 Claims, 11 Drawing Sheets

Fig. 1a
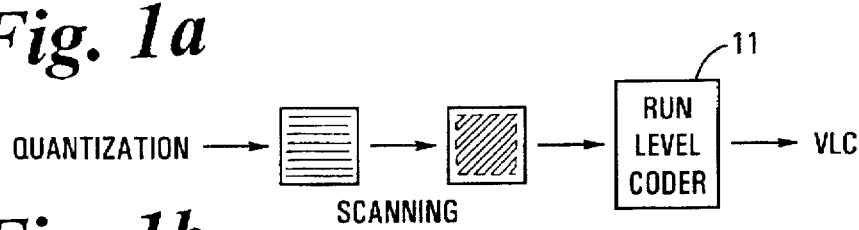
Fig. 1b
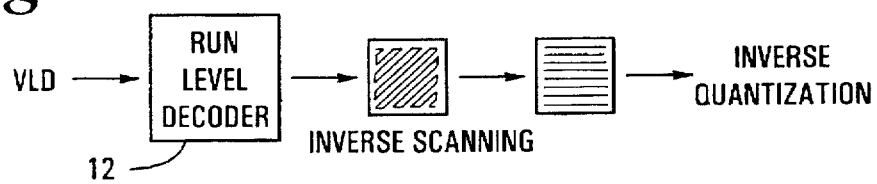
Fig. 2a
| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
Fig. 2b
| 0 | 8 | 16 | 24 | 32 | 40 | 48 | 56 |
|---|---|---|---|---|---|---|---|
| 1 | 9 | 17 | 25 | 33 | 41 | 49 | 57 |
| 2 | 10 | 18 | 26 | 34 | 42 | 50 | 58 |
| 3 | 11 | 19 | 27 | 35 | 43 | 51 | 59 |
| 4 | 12 | 20 | 28 | 36 | 44 | 52 | 60 |
| 5 | 13 | 21 | 29 | 37 | 45 | 53 | 61 |
| 6 | 14 | 22 | 30 | 38 | 46 | 54 | 62 |
| 7 | 15 | 23 | 31 | 39 | 47 | 55 | 63 |
Fig. 2c
| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |
Fig. 2d
| 0 | 4 | 6 | 20 | 22 | 36 | 38 | 52 |
|---|---|---|---|---|---|---|---|
| 1 | 5 | 7 | 21 | 23 | 37 | 39 | 53 |
| 2 | 8 | 19 | 24 | 34 | 40 | 50 | 54 |
| 3 | 9 | 18 | 25 | 35 | 41 | 51 | 55 |
| 10 | 17 | 26 | 30 | 42 | 46 | 56 | 60 |
| 11 | 16 | 27 | 31 | 43 | 47 | 57 | 61 |
| 12 | 15 | 28 | 32 | 44 | 48 | 58 | 62 |
| 13 | 14 | 29 | 33 | 45 | 49 | 59 | 63 |

Fig. 4
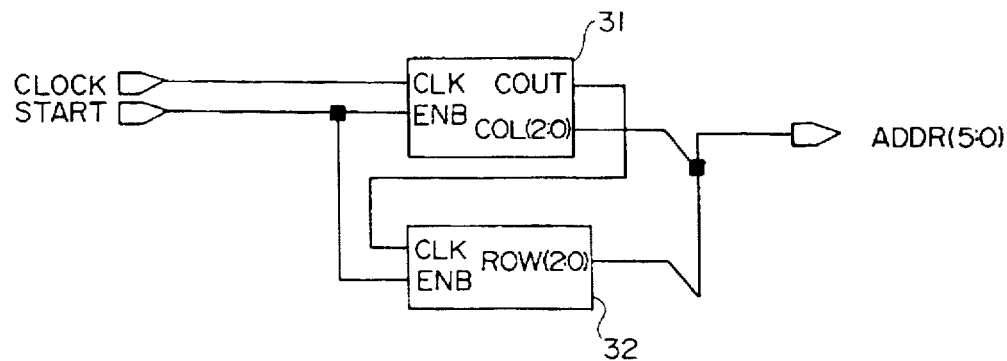
Fig. 5
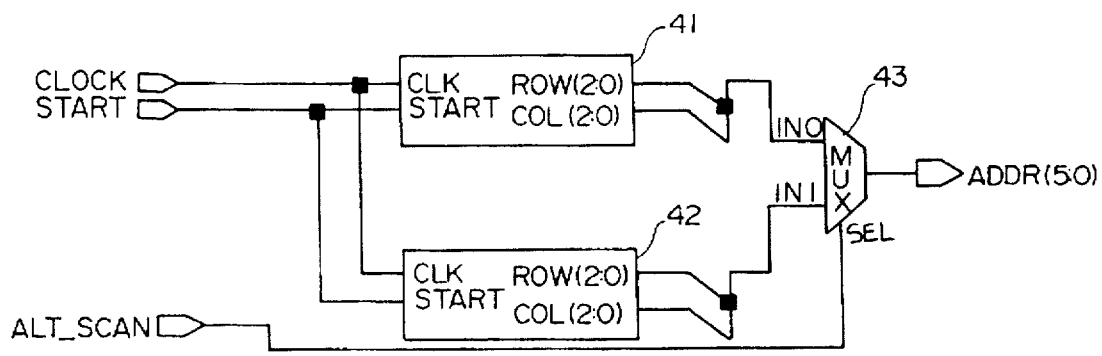
Fig.6
| ROW    | 0 | 0 | 1 | 2 | 1 | 0 | 0 | 1 | 2 | 3 | 4 | 3 | 2 | 1 | 0 | 0 | 1 | 2 | 3 | 4 | 5 | 6 | 5 | 4 | 3 | 2 | 1 | 0 | 0 | 1 | 2 | 3 | 4 | 5 | 6 | 7 |
|--------|---|---|---|---|---|---|---|---|---|---|---|---|---|---|---|---|---|---|---|---|---|---|---|---|---|---|---|---|---|---|---|---|---|---|---|---|
| COLUMN | 1 | 1 | 0 | 0 | 1 | 2 | 3 | 2 | 1 | 0 | 0 | 1 | 2 | 3 | 4 | 5 | 4 | 3 | 2 | 1 | 0 | 0 | 1 | 2 | 3 | 4 | 5 | 6 | 7 | 6 | 5 | 4 | 3 | 2 | 1 | 0 |
| ROW    | 7 | 6 | 5 | 4 | 3 | 2 | 1 | 2 | 3 | 4 | 5 | 6 | 7 | 7 | 6 | 5 | 4 | 3 | 4 | 5 | 6 | 7 | 7 | 6 | 5 | 6 | 7 | 7 |
|--------|---|---|---|---|---|---|---|---|---|---|---|---|---|---|---|---|---|---|---|---|---|---|---|---|---|---|---|---|
| COLUMN | 1 | 2 | 3 | 4 | 5 | 6 | 7 | 7 | 6 | 5 | 4 | 3 | 2 | 7 | 3 | 4 | 5 | 6 | 7 | 6 | 5 | 4 | 5 | 6 | 7 | 7 | 6 | 7 |

Fig.10

| ROW | 0 1 2 3 0 1 | 0 1 2 3 4 5 6 7 | 7 6 5 4 3 2 0 1 | 0 1 2 3 4 5 6 7 | 4 5 6 7 2 3 0 1 |
|---|---|---|---|---|---|
| COLUMN | 0 0 0 0 1 1 | 2 2 1 1 0 0 0 0 | 1 1 1 1 2 2 3 3 | 4 4 3 3 2 2 2 2 | 3 3 3 3 4 4 5 5 |

| ROW | 0 1 2 3 4 5 6 7 | 4 5 6 7 2 3 0 1 | 2 3 4 5 6 7 | 4 5 6 7 |
|---|---|---|---|---|
| COLUMN | 6 6 5 5 4 4 4 4 | 5 5 5 5 6 6 7 7 | 7 7 6 6 6 6 | 7 7 7 7 |

Fig. 11

|  | 0 -> 1 | 000- > 001 |  |
|---|---|---|---|
|  | 0 -> 2 | 000- > 010 |  |
|  | 0 -> 3 | 000- > 011 |  |
|  | 0 -> 4 | 000- > 100 |  |
|  | 0 -> 5 | 000- > 101 |  |
|  | 0 -> 6 | 000- > 110 |  |
|  | 0 -> 7 | 000- > 111 |  |

Fig.12

|  | 0 1 2 3  0 1 | 0 1 2 3 4 5 6 7 | 7 6 5 4 3 2  0 1 | 0 1 2 3 4 5 6 7 |
|---|---|---|---|---|
|  | 7 6 5 4  3 2 1 0 | 0 1 2 3 4 5 6 7 | 7 6 5 4 3 2  1 0 | 0 1 2 3 4 5 6 7 |
|  | A3     L2 | PASS | PASS     L1 | PASS |

|  | 4 5 6 7  2 3 0 1 | 0 1 2 3 4 5 6 7 | 4 5 6 7  2 3 0 1 | 2 3 4 5 6 7 | 4 5 6 7 |
|---|---|---|---|---|---|
|  | 7 6 5 4  3 2 1 0 | 0 1 2 3 4 5 6 7 | 7 6 5 4  3 2 1 0 | 0 1 2 3 4 5 6 7 | 7 6 5 4 |
|  | L2     L1 | PASS | L2     L1 | PASS | L2 |

ZIG-ZAG AND ALTERNATE SCAN CONVERSION CIRCUIT FOR ENCODING/DECODING VIDEOS

BACKGROUND OF THE INVENTION

1. Field of the Invention

The present invention relates to a zig-zag and alternate scan conversion circuit for encoding/decoding videos, and more particularly to a zig-zag and alternate scan conversion circuit which is structured only by logic circuits using a regularity of scan address patterns, thereby achieving an improvement in processing speed and a reduction in area. The zig-zag and alternate scan conversion circuit can be applied to systems requiring the creation of scan addresses in systems which basically use digital signals obtained from broad band-integrated service digital networks (B-ISDN's), high definition televisions, digital televisions, etc.

2. Description of the Prior Art

Generally, Motion Pictures Expert Group (MPEG), International Standardization Organization (ISO)/IEC JTC1/SC29 WG11 advises a forward scanning and an inverse scanning respectively in steps of quantization-scanning-variable length coding (encoder) and variable length decoding-inverse scanning-inverse quantization (decoder) in the construction of an encoder and a decoder for video coding.

Encoders use a forward scanning method whereas decoders use a inverse scanning method. Both the forward and inverse scanning methods may be carried out in either a zig-zag or an alternate scanning manner.

In either the zig-zag or alternate scanning, addresses are created by use of a zig-zag and alternate scan circuit. The created addresses are used as write addresses or read addresses for memories. Whether raster addresses are created in columns or in rows slightly influences the realization of processing modules preceding or following a scanning module. For this reason, both the above-mentioned scanning methods should be realized.

As a conventional method, there is a method using a look-up table. In accordance with this method, scan address patterns are simply stored in the look-up table so that scan addresses to be converted can be stored in the form of data in memory locations corresponding to designated addresses, respectively.

This method requires a memory with a large memory area. It also involves a problem in high-speed processing because its processing speed is limited by the operation speed of the memory. Furthermore, it is impossible to realize a very large scale integration (VLSI) using this method.

SUMMARY OF THE INVENTION

Therefore, an object of the invention is to provide a zig-zag and alternate scan conversion circuit for encoding/decoding videos which is structured only by logic circuits using a regularity of scan address patterns, thereby achieving an improvement in processing speed and a reduction in area.

In accordance with the present invention, this object is accomplished through a zig-zag and alternate scan conversion circuit for encoding/decoding videos comprising: a zig-zag and alternate scan address generating unit for receiving a start signal informing of the start of a desired operation, a basic operation clock signal, and a control signal indicative of whether the scan pattern of input data is a zig-zag scan pattern or an alternate scan pattern, and executing an operation for writing the input data on a RAM and reading them from the RAM based on the received signals; a raster address generating unit for receiving the same signals as those received in the zig-zag and alternate scan address generating unit and executing a writing/reading operation of the input data; a pair of multiplexor units each for appropriately selecting an address signal from the scan address generating unit and raster address generating unit in accordance with a control signal; and a latch unit for outputting address signals selected from the multiplexor units while controlling the timing of the address signals.

BRIEF DESCRIPTION OF THE DRAWINGS

Other objects and aspects of the invention will become apparent from the following description of embodiments with reference to the accompanying drawings in which:

FIGS. 1a and 1b are views respectively explaining the concept of a scanning conversion according to the present invention;

FIGS. 2a to 2d are diagrams explaining the definition of a scan conversion to explain the present invention;

FIG. 4 is a diagram illustrating a raster address generating unit shown in FIG. 3;

FIG. 5 is a diagram illustrating a scan address generating unit shown in FIG. 3;

FIG. 6 is a diagram illustrating patterns of zig-zag scan addresses in accordance with the present invention;

FIG. 10 is a diagram illustrating patterns of alternate scan addresses in accordance with the present invention;

FIG. 11 is a diagram illustrating a bit conversion for the generation of alternate scan addresses in accordance with the present invention;

FIG. 12 is a diagram illustrating patterns of alternate scan addresses in accordance with the present invention;

DETAILED DESCRIPTION OF THE PREFERRED EMBODIMENTS

Figure 3:
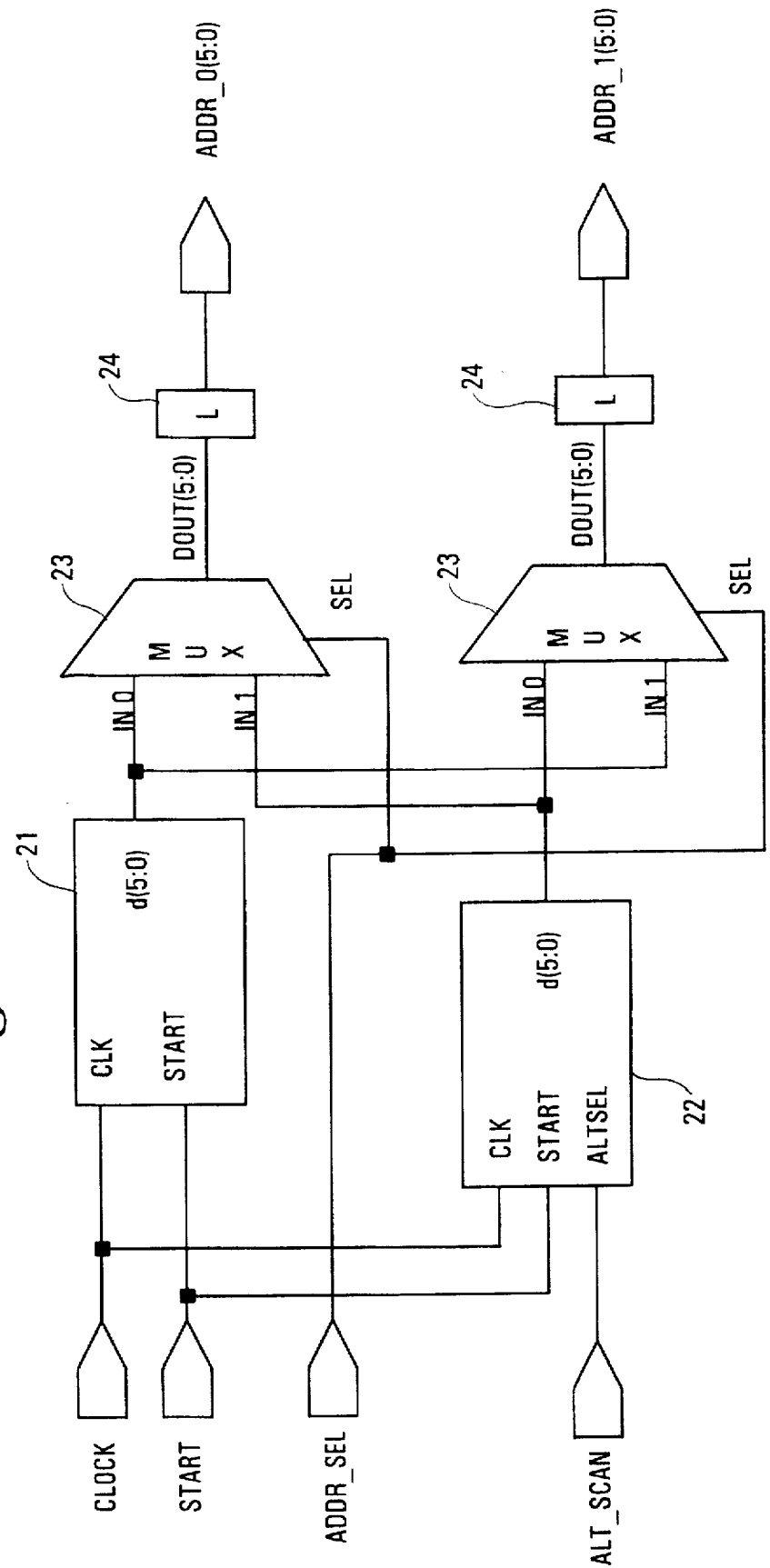
FIG. 3 is diagram illustrating a scan conversion circuit according to an embodiment of the present invention.

FIGS. 1a and 1b are views respectively explaining the concept of a scanning conversion for encoding/decoding videos according to the present invention. FIG. 1a is a view explaining the concept of a scanning conversion carried out in an encoder unit whereas FIG. 1b is a view explaining the concept of a scanning conversion carried out in a decoder unit.

Data obtained after a quantization processing in an encoder are arranged in the form of a 8×8 matrix. These data are rearranged in accordance with their bit generation frequencies. This process is called "a forward scanning" or simply "a scanning". After completing such a scanning, the number of successive 0's in the scanned arrangement is counted. The data are then re-arranged in the form of sets consisting of numbers of 0's and non-zero values respectively following zero, thereby creating a new code which is a combination of runs and levels. The created code is then sent to a variable length coder (VLC). These procedures are carried out by a run level coder (RLC).

On the other hand, the decoder requires the procedure of recovering the scanned arrangement of data in the form of a progressive arrangement. This procedure is called "an inverse scanning". In this procedure, the decoder should be provided at its input stage with a unit for receiving data from a variable length decoder (VLD) and recovering the received data in the form of runs and levels. This unit is a run level decoder (RLD).

FIGS. 2a to 2d are diagrams explaining a zig-zag scanning and an alternate scanning respectively carried out for data progressively scanned in rows and data progressively scanned in columns. FIG. 2a shows data progressively scanned in rows whereas FIG. 2B shows data progressively scanned in columns. FIG. 2c shows the zig-zag scanning for the data of FIG. 2a whereas FIG. 2d shows the alternate scanning for the data of FIG. 2b.

Data obtained by the scanning of FIG. 2c or 2d can be expressed by a function of "scan(alt_scan)(u)(v)" with regard to a single variable. When the term "alt_scan" in the function is 0, the scanning is a zig-zag scanning. When the term "alt_scan" is 1, the scanning is an alternate scanning. This method is a scanning method for creating efficient run/level codes by utilizing the characteristic that a higher value is allocated to a discrete cosine transform (DCT) coefficient with a lower frequency and that DCT coefficients approximate to 0 or 1 as their frequencies become higher.

In other words, this method is based on the fact that the rate of data having a value of 0 increases from the left upper end (lower frequency end) of the data arrangement to the right lower end in a diagonal direction. Consequently, the present invention realizes the zig-zag and alternate scanning in a logical fashion without using a look-up table.

The generation of addresses for forward and inverse scanning is achieved by generating addresses of zig-zag or alternate-scanned data by referring to a flag "alt_scan" for determining whether the executed scanning is a zig-zag scanning or an alternate scanning, thereby designating addresses of a memory. When data is subsequently read from the memory, this data reading is executed in the order of 0th to 63rd addresses.

In other words, data arranged in the scanned order are written in a RAM in the order of scan addresses thereof and then read in the order of raster addresses so that they can be recovered in the order of data not scanned yet. On the other hand, progressively arranged data are written in the RAM in the order of raster addresses and then read in the order of scan addresses so that addresses can be generated in the data scanning order.

Input signals required to realize a scanning module include a a basic operation clock signal and a signal "alt_scan" indicative of whether the scan pattern is a zig-zag scan pattern or an alternate scan pattern. On the other hand, the scanning module generates an output signal which is 6-bit address data.

FIG. 3 is diagram illustrating a scan conversion circuit according to an embodiment of the present invention. As shown in FIG. 3, the scan conversion circuit includes a zig-zag and alternate scan address generating unit 22 for receiving a start signal "start" informing of the start of a desired operation, a basic operation clock signal "clock", and a control signal "alt_scan" indicative of whether input data has been scanned in a zig-zag manner or in an alternate manner. Based on the received signals, the zig-zag and alternate scan address generating unit 22 executes writing/ reading of input data. The scan conversion circuit also includes a raster address generating unit 21 for receiving the same signals as those received in the zig-zag and alternate scan address generating unit 22 and executing writing/ reading of input data, a pair of multiplexor units 23 each for appropriately selecting an address signal from the scan address generating unit 22 and raster address generating unit 21 in accordance with a control signal "addr_sel", and a latch unit 24 for outputting address signals selected from the multiplexor units 23 while controlling the timing of the address signals.

FIG. 4 is a diagram illustrating the raster address generating unit 21 shown in FIG. 3. As shown in FIG. 4, the raster address generating unit 21 includes a first counter unit 31 for receiving the clock signal "clock" and the start signal "start" and generating row addresses based on the received signals, and a second counter unit 32 for receiving a column address from the first counter unit 31 along with the start signal "start" and generating column addresses based on the received signals.

Both the first and second counter units 31 and 32 are 3-bit modulo 8-counters.

Raster addresses have different patterns depending on whether the generation of addresses is carried out in columns or in rows. Where the generation of addresses is carried out in columns, it is simply realized by a single 6-bit counter. On the other hand, where the generation of addresses is carried out in rows, a pair of 3-bit modulo 8-counters are used. In the latter case, one of the counters serves to generate row addresses whereas the other counter serves to generate column addresses.

FIG. 5 is a diagram illustrating the scan address generating unit 22 shown in FIG. 3. As shown in FIG. 5, the scan address generating unit 22 includes a zig-zag scan unit 41 and an alternative scan unit 42 each for receiving the clock signal and the start signal, dividing input data into those in columns and those in rows based on the received signals and then summing them, thereby generating addresses. The scan address generating unit 22 also includes a multiplexor unit 43 for selecting an address to be currently used among addresses from the zig-zag scan unit 41 and alternate scan unit 42 in accordance with the control signal "alt_scan".

The signal "alt scan" is a signal adapted to select an address to be currently used form two kinds of addresses. Each module starts its operation in accordance with the start signal "start". The resultant data are divided into those in columns and those in rows and are finally summed together, thereby generating addresses.

FIG. 6 is a diagram illustrating patterns of zig-zag scan addresses in accordance with the present invention. In accordance with the definition of the zig-zag scanning as shown in FIG. 2, the patterns of zig-zag scan addresses can be divided into those in columns and rows, as shown in FIG. 6. The divided data can be realized in the form of an efficient logic by using counters which are appropriately controlled. The control of the counters is carried out in such a manner that modes of up/down counters are changed in an alternating manner while incrementing counted values at the start and end stages of the counting operation. The variation in value in columns is opposite to the variation in value in rows. In the case of FIG. 6, accordingly, the patterns of generated addresses may include (0,1), (0,1), (1,0), (2,0), (1,1), (0,2), . . . , (7,0), (7,1), (6,2), . . . . . and (7,7) which are indicated in the form of rows and columns. These patterns can be easily realized in the form of a logic because it has a considerable regularity.

The last portion of the first half of the address patterns corresponds to a diagonal portion extending from the right upper end of the matrix according to the definition of the zig-zag scanning to the left lower end.

Figure 7:
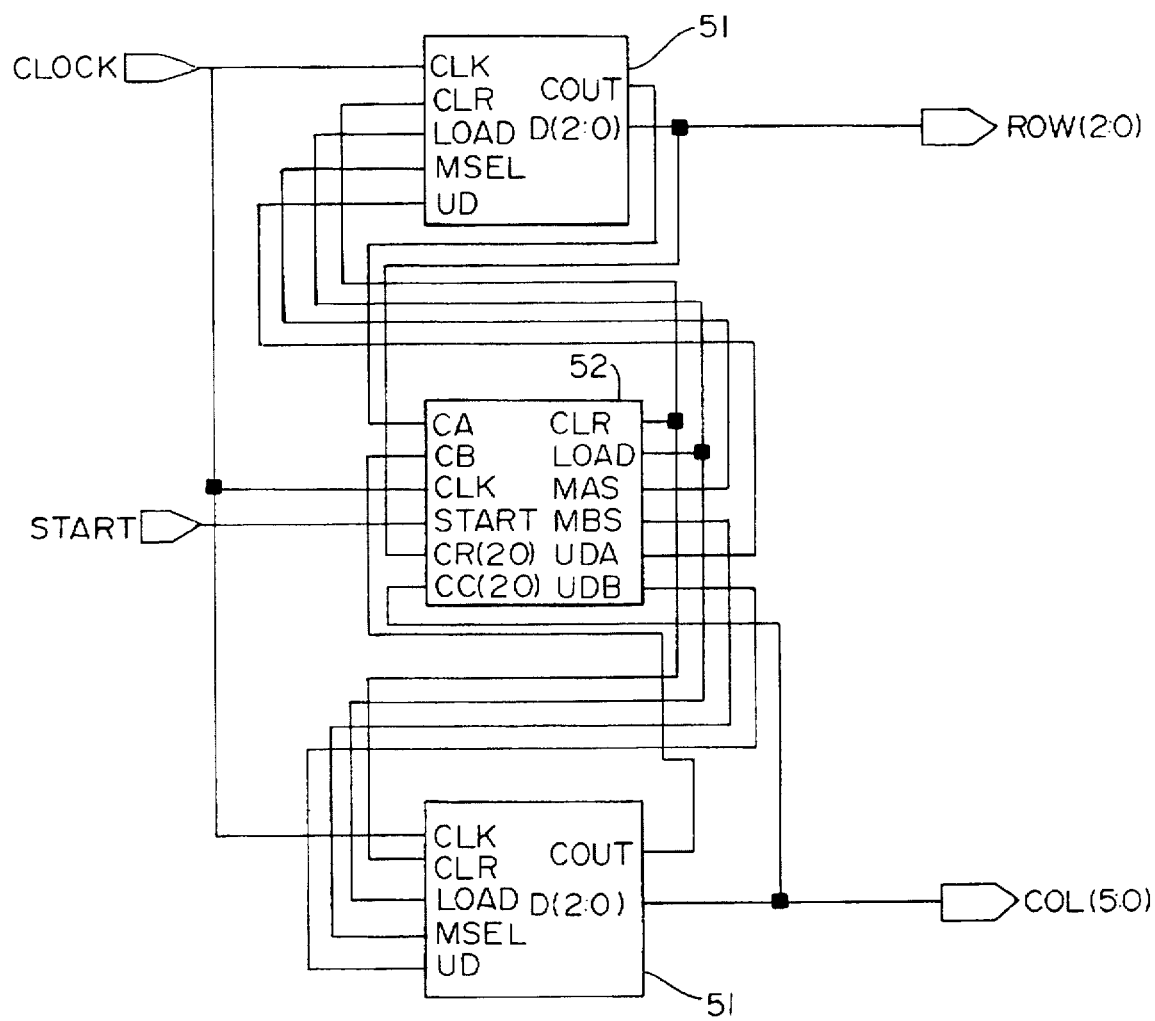
FIG. 7 is a diagram illustrating a zig-zag scan address generating unit shown in FIG. 5.

FIG. 7 is a diagram illustrating the zig-zag scan address generating unit 41 shown in FIG. 5. As shown in FIG. 7, the zig-zag scan address generating unit 41 includes a pair of counter module units 51 for respectively generating column and row addresses, and a control module unit 52 for controlling the counter module units 51.

Figure 8:
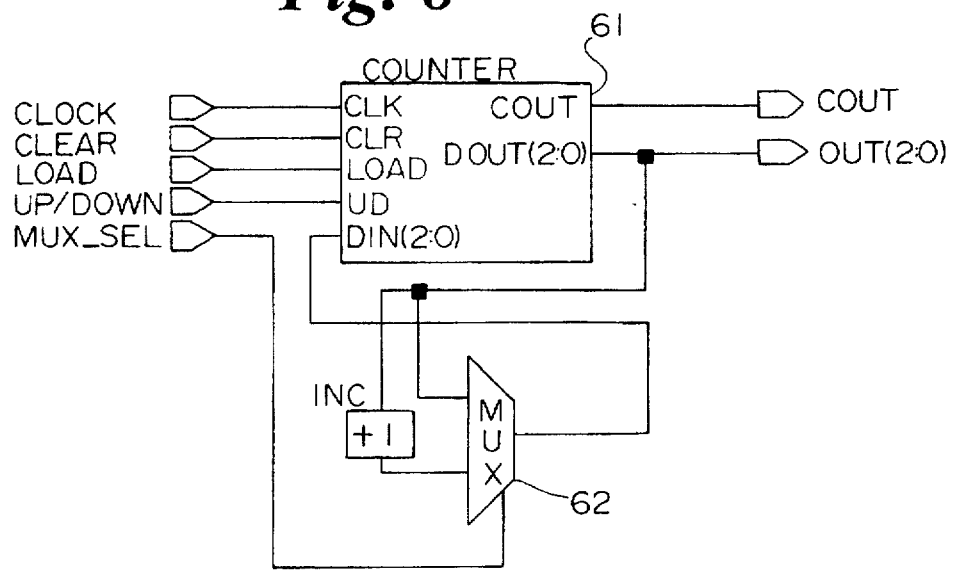
FIG. 8 is a circuit diagram illustrating a counter module unit shown in FIG. 7.

FIG. 8 is a diagram illustrating each counter module unit 51 shown in FIG. 7. As shown in FIG. 8, the counter module unit 51 includes an up/down counter unit 61 for receiving a clock signal along with control signals "clear", "load" and "up/down" and outputting a counted value and a carry based on the received signals, and a multiplexor unit 62 for receiving a fed-back output from the up/down counter unit 61 along with a value obtained by adding 1 to the fed-back output, selecting one of the received signals based on a control signal "mux_sel" and sending the selected signal to the up/down counter unit 61.

Figure 9:
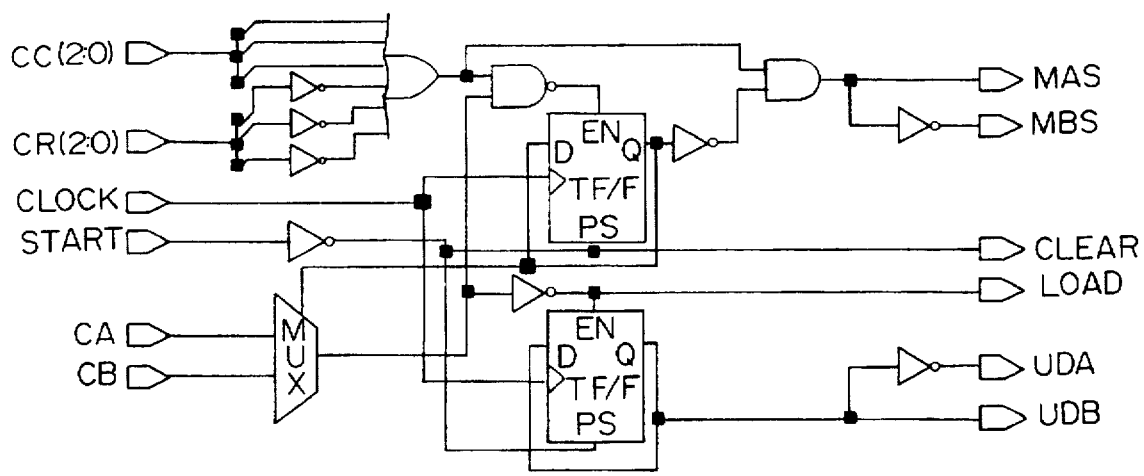
FIG. 9 is a circuit diagram illustrating a control module unit shown in FIG. 7.

FIG. 9 is a diagram illustrating the control module unit 52 shown in FIG. 7. The control module unit 52 receives outputs from the column and row counter units along with a carry and generates control signals "clear", "load" and "up/down" based on the received signals.

Address generating patterns of the alternate scan unit are shown in FIG. 2d. When the address generating patterns are indicated while being divided into columns and rows, they are depicted as in FIG. 10. Referring to FIG. 10, it can be found that the address generating patterns have a non-regularity. However, when these patterns are adjusted by appropriately covering them with a mask, it is possible to obtain considerably regular patterns. When a bit conversion method as shown in FIG. 11 is applied to the array, an effective array can be reproduced. For example, where a decimal 0 conversion is applied, it is possible to convert decimal numbers into values within a 3-bit range by inverting bits of each decimal number. In this case, when the third bit digit of the inverted number is inverted, the inverted number becomes "L1". When the second bit digit is inverted, the inverted number becomes "B1". When the second and third bit digits are inverted, the inverted number becomes "L2". When the first bit digit is inverted, the inverted number becomes "F1". Where the first and third bit digits are inverted, the inverted number becomes "B2". Where the first and second bit digits are inverted, the inverted number becomes "F2". On the other hand, where all the first, second and third bit digits are inverted, the inverted number becomes "A3". In such a manner, all values within a 3-bit range can be converted.

Accordingly, addresses generated in the alternate scan order can be easily realized in the form of a logic by converting them as shown in FIG. 12. The conversion is carried out only for column addresses because row addresses have a regularity.

FIG. 12 is a diagram illustrating patterns of alternate scan addresses. In FIG. 12, black boxes indicate pattern portions where the operation of the associated counters should be stopped. These patterns can be easily realized using up/down counters. Only slight control is necessary due to the bit conversion.

Figure 13:
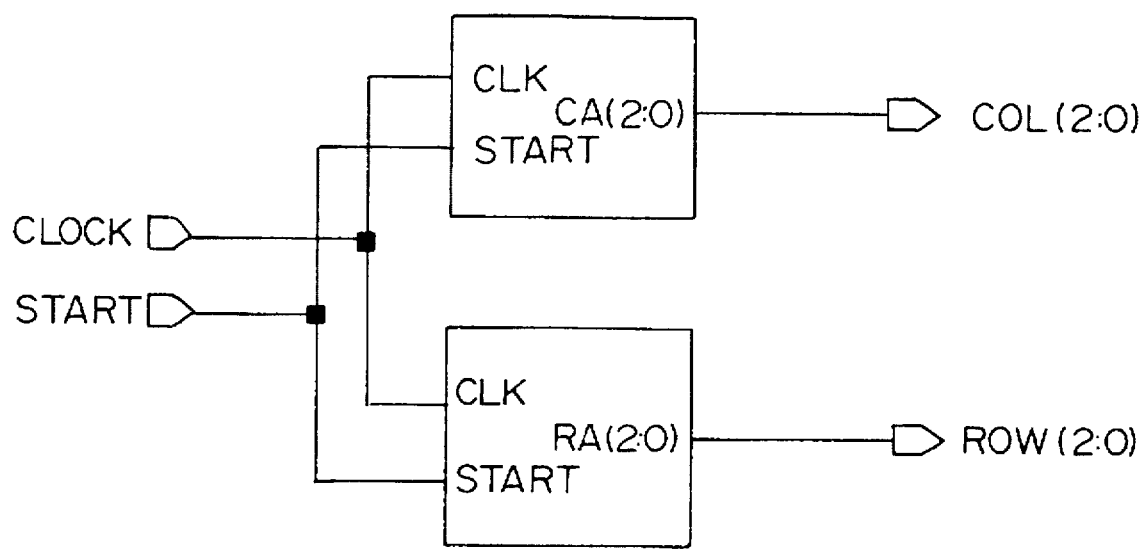
FIG. 13 is a block diagram illustrating an alternate scan address generating unit shown in FIG. 5.
Figure 14:
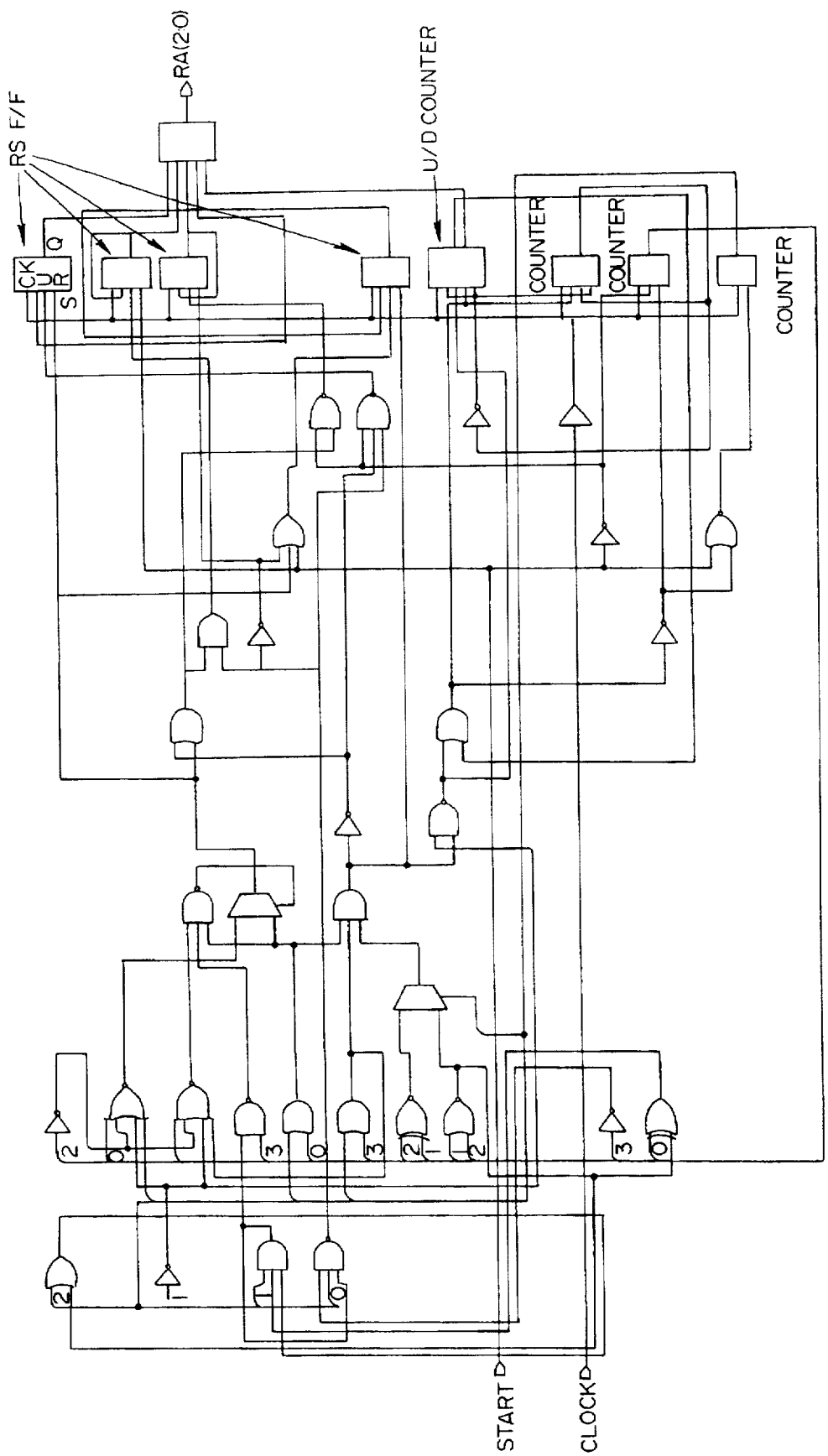
FIG. 14 is a circuit diagram illustrating a column address generating unit shown in FIG. 13.
Figure 15:
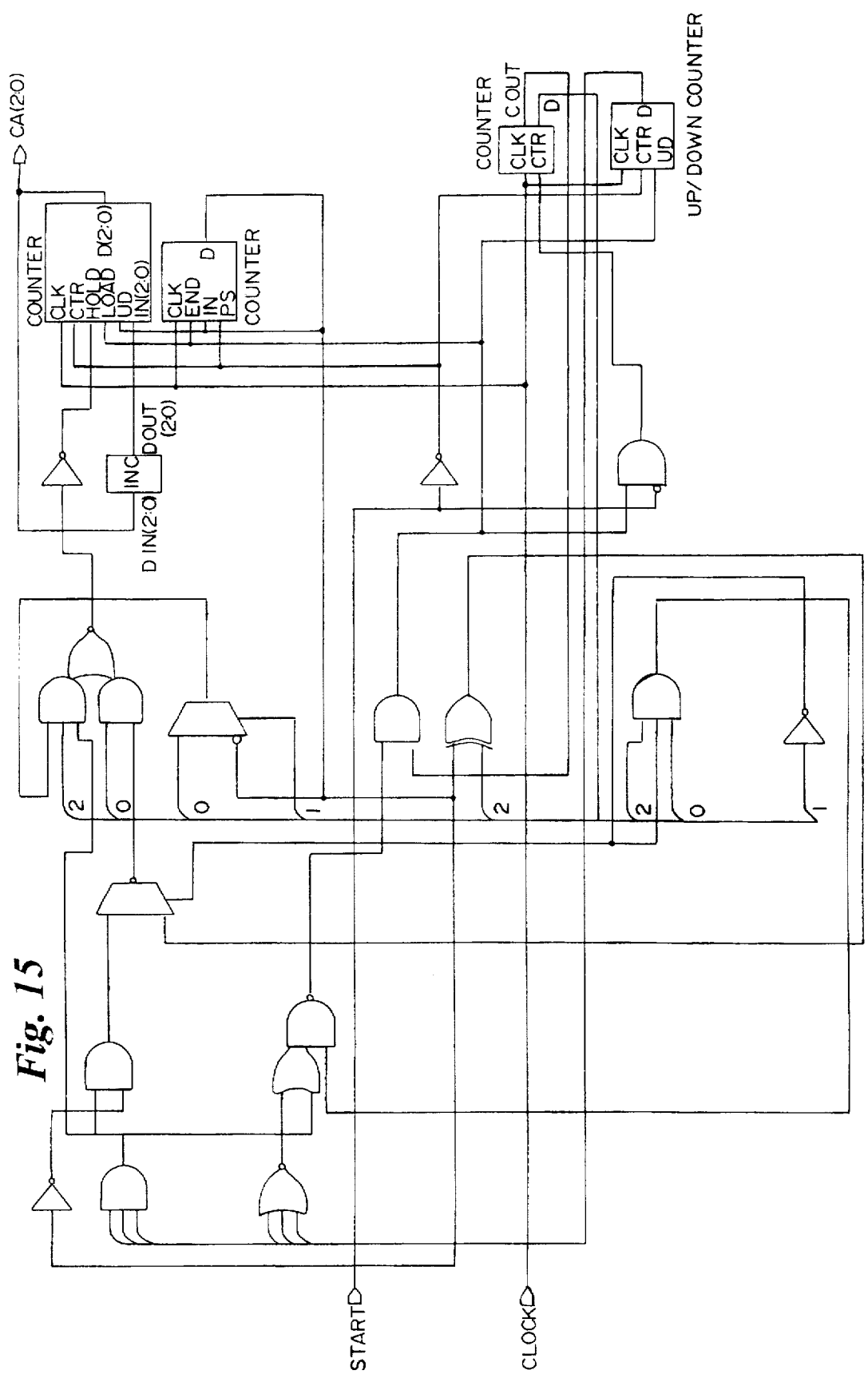
FIG. 15 is a circuit diagram illustrating a row address generating unit shown in FIG. 13.

FIG. 13 is a block diagram illustrating the alternate scan address generating unit 42 shown in FIG. 5. The alternate scan address generating unit 42 includes row and column address generating units for respectively generating row and column addresses based on the clock signal "clock" and the start signal "start" both received therein. The internal circuits of the row and column address generating units are shown in FIGS. 14 and 15, respectively. The internal circuits are simply realized in accordance with the above-mentioned address patterns. Accordingly, the present invention achieves an improvement in operation and a reduction in area, as compared to conventional methods using-lookup tables.

FIGS. 16a to 16d are diagrams each illustrating a timing between the generation of zig-zag scan addresses in a write mode and the generation of raster addresses in a read mode. Where the signal "alt_scan" is 0, the scanning is carried out in a zig-zag fashion. Where the signal "alt_scan" is 1, the scanning is carried out in an alternate fashion. In FIG. 16, "MB_ck" denotes a macro block clock. The address generation module initiates its operation based on the macro block clock. Scanning is executed for 6 blocks each consisting of 64 addresses. As a result of the scanning, addresses of 0 and 1 are generated. These addresses are used as read or write addresses, respectively, to designate addresses of the memory. Accordingly, a scan conversion is achieved. An inverse scan conversion is also achieved by using the addresses while changing their read and write address functions.

Figure 16A:
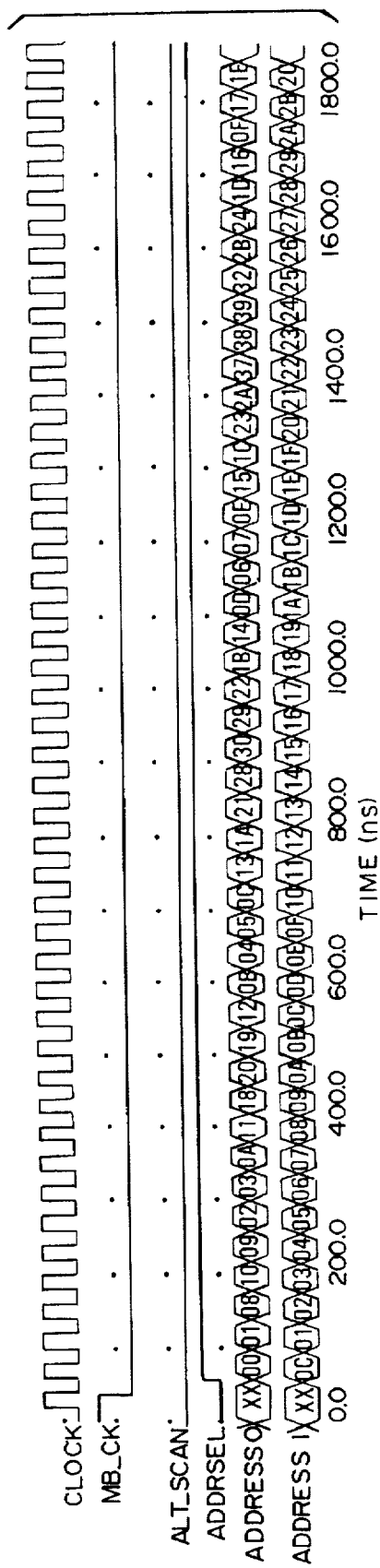
FIGS. 16a to 16d are diagrams each illustrating a timing between the generation of zig-zag scan addresses and the generation of raster addresses in accordance with the present invention.
Figure 16B:
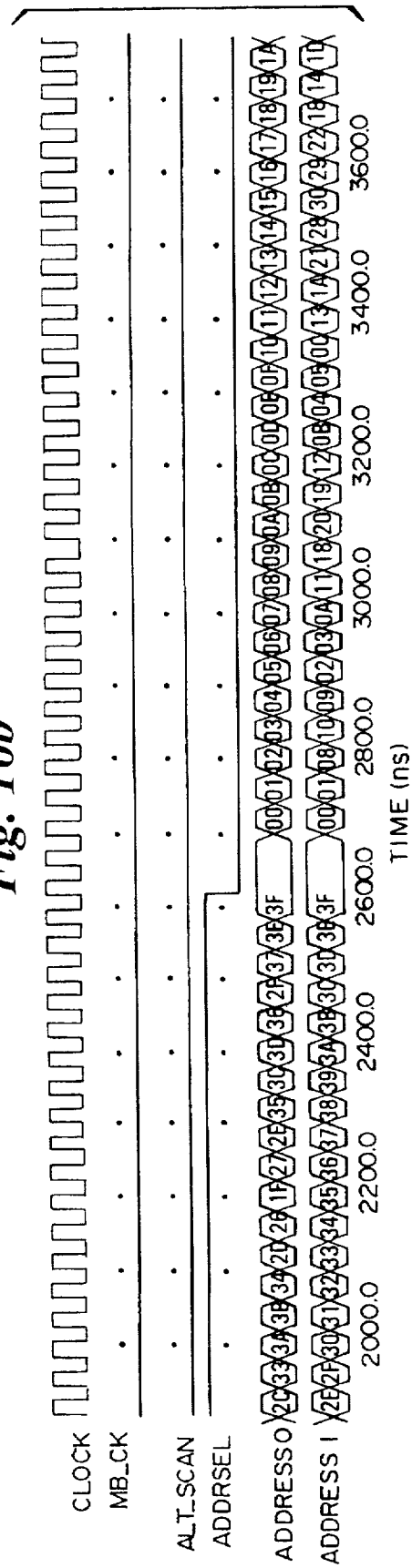
Figure 16C:
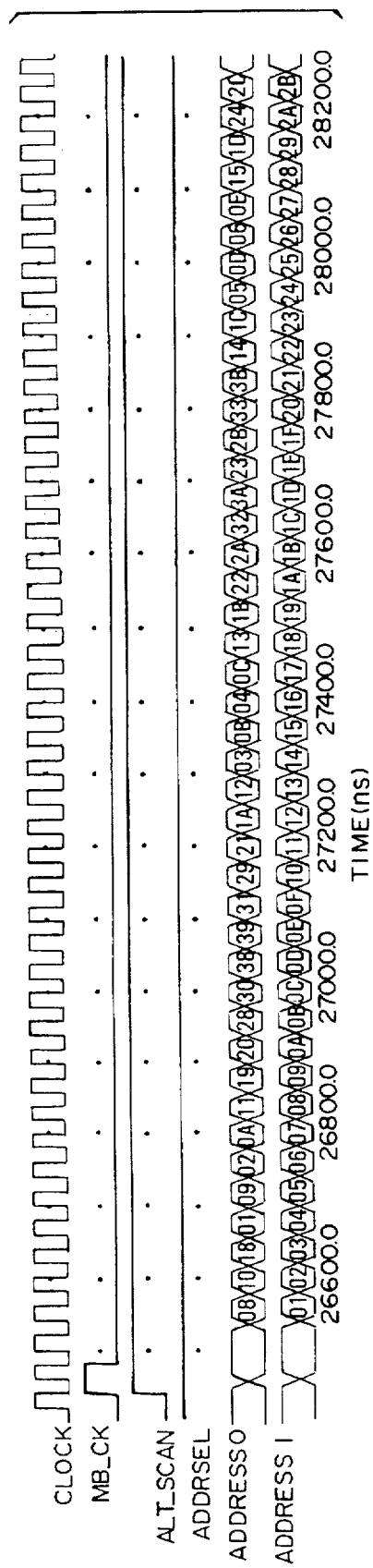
Figure 16D:
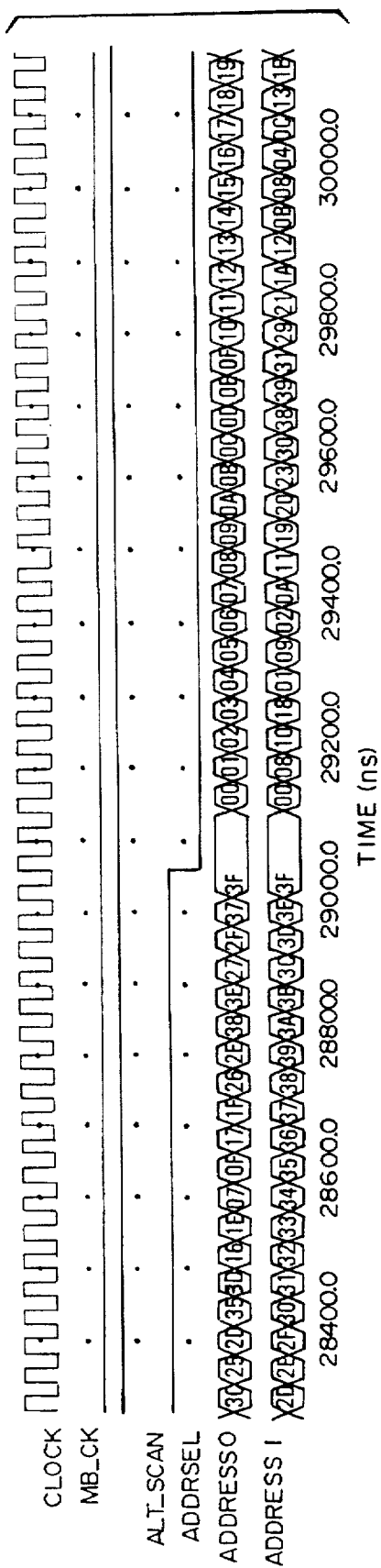

FIG. 16a is a diagram showing the timing when the operation of the address generating module is initiated when the signal "alt_scan" is 0, namely, when a zig-zag scanning is executed. FIG. 16b is a diagram showing the timing when the scanning advances from one block to a next block. On the other hand, FIGS. 16c and 16d are diagrams respectively corresponding to FIGS. 16a and 16b when the signal "alt_scan" is 1, namely, when an alternate scanning is executed.

As apparent from the above description, the zig-zag and alternate scan conversion circuit for encoding/decoding videos of the present invention is efficient in terms of processing speed and memory area which are important factors for the realization of a VLSI because it utilizes a regularity of scan address patterns, in a different manner than conventional methods using look-up tables. Accordingly, the circuit of the present invention can be applied to systems requiring high-speed data processing such as B-ISDN terminals and high definition televisions. The circuit of the present invention may also be easily used in systems having circuits designed in the form of a VLSI which will be used as an application-specific integrated circuit (ASIC).

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A zig-zag and alternate scan conversion circuit for encoding/decoding videos comprising:
   a zig-zag and alternate scan address generating unit for receiving a start signal informing of the start of a desired operation, a basic operation clock signal, and a control signal indicative of whether the scan pattern of input data is a zig-zag scan pattern or an alternate scan pattern, and executing an operation for writing the input data on a RAM and reading them from the RAM based on the received signals;

a raster address generating unit for receiving the same signals as those received in the zig-zag and alternate scan address generating unit and executing a writing/reading operation of the input data;

a pair of multiplexor units each for appropriately selecting an address signal from the scan address generating unit and raster address generating unit in accordance with a control signal; and a latch unit for outputting address signals selected from the multiplexor units while controlling the timing of the address signals.

2. The zig-zag and alternate scan conversion circuit for encoding/decoding videos in accordance with claim 1, wherein the raster address generating unit comprises:

a first counter unit for receiving the clock signal and the start signal and generating row addresses based on the received signals; and a second counter unit for receiving a column address from the first counter unit along with the start signal and generating column addresses based on the received signals.

3. The zig-zag and alternate scan conversion circuit for encoding/decoding videos in accordance with claim 2, wherein both the first and second counter units are 3-bit modulo 8-counters.

4. The zig-zag and alternate scan conversion circuit for encoding/decoding videos in accordance with claim 1, wherein the scan address generating unit comprises:

a zig-zag scan address generating unit and an alternate scan address generating unit each for receiving the clock signal and the start signal, dividing the input data into columns and into rows based on the received signals and then summing them, thereby generating addresses; and a multiplexor unit for selecting an address to be currently used among addresses from the zig-zag scan unit and alternate scan unit in accordance with a control signal.

5. The zig-zag and alternate scan conversion circuit for encoding/decoding videos in accordance with claim 4, wherein the zig-zag scan address generating unit has patterns of addresses divided into columns and into rows.

6. The zig-zag and alternate scan conversion circuit for encoding/decoding videos in accordance with claim 4, wherein the zig-zag scan address generating unit comprises:

a pair of counter module units for respectively generating column and row addresses; and a control module unit for controlling the counter module units.

7. The zig-zag and alternate scan conversion circuit for encoding/decoding videos in accordance with claim 6, wherein each of the counter module units comprises:

an up/down counter unit for receiving a clock signal along with clear, load and up/down control signals and outputting a counted value and a carry based on the received signals; and a multiplexor unit for receiving a fed-back output from the up/down counter unit along with a value obtained by adding 1 to the fed-back output, selecting one of the received signals based on a control signal and sending the selected signal to the up/down counter unit.

8. The zig-zag and alternate scan conversion circuit for encoding/decoding videos in accordance with claim 7, wherein the control module unit receives outputs from the column and row counter module units along with a carry and generates the clear, load and up/down control signals based on the received signals.

9. The zig-zag and alternate scan conversion circuit for encoding/decoding videos in accordance with claim 4, wherein the alternate scan address generating unit comprises row and column address generating units for respectively generating row and column addresses based on the clock signal and the start signal both received therein.

10. The zig-zag and alternate scan conversion circuit for encoding/decoding videos in accordance with claim 9, wherein the alternate scan address generating unit inverts bits of row address patterns for an alternate scan so that the address patterns can be converted into values within a 3-bit range, respectively.

* * * * *